(12) United States Patent
Leong et al.

(10) Patent No.: US 7,328,364 B1
(45) Date of Patent: Feb. 5, 2008

(54) TECHNIQUE FOR COHERENT SUSPENSION OF I/O OPERATIONS IN A RAID SUBSYSTEM

(75) Inventors: James Leong, Hillsborough, CA (US); Scott Schoenthal, San Ramon, CA (US); Srinivasan Viswanathan, Fremont, CA (US); Rajesh Sundaram, Mountain View, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 464 days.

(21) Appl. No.: 10/394,917

(22) Filed: Mar. 21, 2003

(51) Int. Cl.
G06F 11/00 (2006.01)
(52) U.S. Cl. .................................................. 714/6
(58) Field of Classification Search ................ 714/6
See application file for complete search history.

(56) References Cited

U.S. PATENT DOCUMENTS

| | | | |
|---|---|---|---|
| 3,876,978 | A | 4/1975 | Bossen et al. |
| 4,092,732 | A | 5/1978 | Ouchi |
| 4,201,976 | A | 5/1980 | Patel |
| 4,205,324 | A | 5/1980 | Patel |
| 4,375,100 | A | 2/1983 | Tsuji et al. |
| 4,467,421 | A | 8/1984 | White |
| 4,517,663 | A | 5/1985 | Imazeki et al. |
| 4,667,326 | A | 5/1987 | Young et al. |
| 4,688,221 | A | 8/1987 | Nakamura et al. |
| 4,722,085 | A | 1/1988 | Flora et al. |
| 4,755,978 | A | 7/1988 | Takizawa et al. |
| 4,761,785 | A | 8/1988 | Clark et al. |
| 4,775,978 | A | 10/1988 | Hartness |
| 4,796,260 | A | 1/1989 | Schilling et al. |
| 4,817,035 | A | 3/1989 | Timsit |
| 4,825,403 | A | 4/1989 | Gershenson et al. |
| 4,837,680 | A | 6/1989 | Crockett et al. |
| 4,847,842 | A | 7/1989 | Schilling |
| 4,849,929 | A | 7/1989 | Timsit |
| 4,849,974 | A | 7/1989 | Schilling et al. |
| 4,849,976 | A | 7/1989 | Schillling et al. |
| 4,870,643 | A | 9/1989 | Bultman et al. |
| 4,899,342 | A | 2/1990 | Potter et al. |
| 4,989,205 | A | 1/1991 | Dunphy, Jr. et al. |
| 4,989,206 | A | 1/1991 | Dunphy, Jr. et al. |

(Continued)

OTHER PUBLICATIONS

U.S. Appl. No. 10/105,039, Leong et al.

(Continued)

*Primary Examiner*—Bryce P Bonzo
(74) *Attorney, Agent, or Firm*—Cesari and McKenna, LLP

(57) ABSTRACT

A technique coherently suspends input/output (I/O) operations in a RAID subsystem of a storage system. A configuration tree of the RAID subsystem has a plurality of objects representing a logical configuration of storage devices coupled to the system. According to the technique, a "freeze" condition may be imposed on an object of the configuration tree to suspend I/O operations directed to that object. In order to freeze, I/O operations underway ("in flight") in the RAID subsystem and directed to the object need to complete sufficiently so as to reach a recoverable state in the event the subsystem subsequently fails prior to an I/O restart procedure. Once a freeze condition has been imposed, new I/O requests directed to the object are inserted onto a freeze list of pending requests at the RAID subsystem and are blocked from processing until the object is "unfrozen" (i.e., the freeze condition is lifted).

16 Claims, 10 Drawing Sheets

U.S. PATENT DOCUMENTS

| | | | |
|---|---|---|---|
| 5,077,736 | A | 12/1991 | Dunphy, Jr. et al. |
| 5,088,081 | A | 2/1992 | Farr |
| 5,101,492 | A | 3/1992 | Schultz et al. |
| 5,128,810 | A | 7/1992 | Halford |
| 5,148,432 | A | 9/1992 | Gordon et al. |
| RE34,100 | E | 10/1992 | Hartness |
| 5,163,131 | A | 11/1992 | Row et al. |
| 5,166,936 | A | 11/1992 | Ewert et al. |
| 5,179,704 | A | 1/1993 | Jibbe et al. |
| 5,202,979 | A | 4/1993 | Hillis et al. |
| 5,208,813 | A * | 5/1993 | Stallmo .......................... 714/7 |
| 5,210,860 | A | 5/1993 | Pfeffer et al. |
| 5,218,689 | A | 6/1993 | Hotle |
| 5,233,618 | A | 8/1993 | Glider et al. |
| 5,235,601 | A | 8/1993 | Stallmo et al. |
| 5,237,658 | A | 8/1993 | Walker et al. |
| 5,257,367 | A | 10/1993 | Goodlander et al. |
| 5,274,799 | A | 12/1993 | Brant et al. |
| 5,305,326 | A | 4/1994 | Solomon et al. |
| 5,351,246 | A | 9/1994 | Blaum et al. |
| 5,410,667 | A | 4/1995 | Belsan et al. |
| 5,537,567 | A | 7/1996 | Galbraith et al. |
| 5,579,475 | A | 11/1996 | Blaum et al. |
| 5,623,595 | A | 4/1997 | Bailey |
| 5,805,788 | A | 9/1998 | Johnson |
| 5,812,753 | A | 9/1998 | Chiariotti |
| 5,819,292 | A | 10/1998 | Hitz et al. |
| 5,862,158 | A | 1/1999 | Baylor et al. |
| 5,884,098 | A | 3/1999 | Mason, Jr. |
| 5,963,962 | A | 10/1999 | Hitz et al. |
| 6,038,570 | A | 3/2000 | Hitz et al. |
| 6,092,215 | A | 7/2000 | Hodges et al. |
| 6,138,201 | A | 10/2000 | Rebalski |
| 6,158,017 | A | 12/2000 | Han et al. |
| 6,223,300 | B1 | 4/2001 | Gotoh |
| 6,532,548 | B1 | 3/2003 | Hughes |
| 6,581,185 | B1 | 6/2003 | Hughes |

OTHER PUBLICATIONS

U.S. Appl. No. 10/105,078, Leong et al.
U.S. Appl. No. 10/105,079, Leong et al.
David Hitz et al. TR3002 File System Design for a NFS File Server Appliance published by Network Appliance, Inc.
Common Internet File System (CIFS) Version: CIFS—Spec 0.9, Storage Networking Industry Association (SNIA), Draft SNIA CIFS Documentation Work Group Work-in-Progress, Revision Date: Mar. 26, 2001.
Fielding et al. (1999) Request for Comments (RFC) 2616, HTTP/1.1.
Anvin, Peter H, "*The Mathematics of RAID 6*," Dec. 2004.
Auspex 4Front NS2000, System Architecture, Network-Attached Storage For a New Millennium, Auspex Engineering Technical Report 24, Jan. 1999.
Bestavros, Azer, et al., *Reliability and Performance of Parallel Disks*, Technical Memorandum 45312-891206-01TM, AT&T, Bell Laboratories, Department 45312, Holmdel, NJ, Dec. 1989.
Bitton, Dina, *Disk Shadowing*, Proceedings of the 14$^{th}$ VLDB Conference, LA, CA (1988).
Bultman, David L., *High Performance SCSI Using Parallel Drive Technology*, In Proc. BUSCON Conf., pp. 40-44, Anaheim, CA, Feb. 1988.
Chen, Peter et al., *Two Papers on RAIDs*. Technical Report, CSD-88-479, Computer Science Division, Electrical Engineering and Computer Sciences, University of California at Berkeley (1988).
Chen, Peter M., et al., *An Evaluation of Redundant Arrays of Disks Using an Amdahl 5890*, Performance Evaluation, pp. 74-85, 1990—check to see if exact same copy as one in WAFL.
Chen, Peter M.., et al, Maximmizing Performance in a Striped Disk Array, Proc. 1990 *ACM SIGARCH 17th Intern*. Symp. on Comp. Arch., Seattle, WA, May 1990, pp. 322-331.
Chen, Peter M., et al., *RAID:High Performance, Reliable Secondary Storage*, ACM Computing Surveys, 26(2):145-185, Jun. 1994.
Chervenak, Ann L., *Performance Measurement of the First RAID Prototype*, Technical Report UCB/CSD 90/574, Computer Science Division (EECS), University of California, Berkeley, May 1990.
Copeland, George, et al., "*A Comparison of High-Availability Media Recovery techniques*," in Proc. ACM-SIGMOD Int. Conf. Management of Data, 1989.
Courtright II, William V., et al., *RAIDframe: A Rapid Prototyping Tool for RAID Systems*, Computer Science Technical Report CMU-CS97-142, Carnegie Mellon University, Pittsburgh, PA 15213, Jun. 4, 1997.
Evans *The Tip of the Iceberg:RAMAC Virtual Array—Part 1*, Technical Support, Mar. 1997, pp. 1-4.
Kim, Michelle Y., *Synchronized Disk Interleaving*, IEEE Transactions on Computers, C-35(11):978-988, Nov. 1986.
Kim, Michelle, et al., *Asynchronous Disk Interleaving Approximating Access Delays*, IEEE Transactions on Computers, vol. 40, No. 7, Jul. 1991, pp. 801-810.
Lawlor, F. D., *Efficient Mass Storage Parity Recovery Mechanism*, IBM Technical Disclosure Bulletin 24(2):986-987, Jul. 1981.
Lee, Edward K., et al., *RAID-II: A Scalable Storage Architecture for High-Bandwidth Network File Service*, Technical Report UCB/CSD 92/672, (Feb. 1992).
Li, Don, et al., *Authors' Reply*, IEEE Transactions on Communications, 46:575, May 1998.
Livny, Miron, et al., *Multi-Disk Management Algorithms*, In Proceedings of the ACM International Conference on Measurement and Modeling of Computer Systems (SIGMETRICS), pp. 69-77, Banff, Alberta, Canada, May 1987.
Meador, Wes E., *Disk Array Systems*, Proceedings of COMPCON, 1989, pp. 143-146.
Ng, Spencer, et al., *Trade-Offs Between Devices and Paths in Achieving Disk Interleaving*, IEEE International Symposium on Computer Architecture, 1988, pp. 196-201.
Ng, Spencer, *Some Design Issues of Disk Arrays*, Proceedings of COMPCON Spring '89, pp. 137-142. IEEE, 1989.
Park, Arvin, et al., *Providing Fault Tolerance In Parallel Secondary Storage Systems*, Technical Report CS-TR-057-86, Princeton, Nov. 1986.
Patel, Arvind M., *Adaptive Cross-Parity (AXP) Code for a High-Density Magnetic Tape Subsystem*, IBM Technical Disclosure Bulletin 29(6):546-562, Nov. 1985.
Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).
Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).
Patterson, David A., et al., *Introduction to Redundant Arrays of Inexpensive Disks (RAID)*. In IEEE Spring 89 COMPCON, San Francisco, IEEE Computer Society Press, Feb. 27-Mar. 3, 1989, pp. 112-117.
STORAGESUITE "Performance Without Compromise: The Virtual Storage Architecture,"catalogue, 1997.
Reddy, A. L. Narasimha, et al., *An Evaluation of Multiple-Disk I/O Systems*, IEEE Transactions on Computers, vol. 38, No. 12, Dec. 1989, pp. 1680-1690.
Schulze, Martin E., *Considerations in the Design of a RAID Prototype*, Computer Science Division, Department of Electrical Engineering and Computer Sciences, Univ. of CA, Berkley, Aug. 25, 1988.
Schulze, Martin., et al., *How Reliable is a RAID?*, Proceedings of COMPCON, 1989, pp. 118-123.
Shirriff, Kenneth W., *Sawmill:A Logging File System for a High-Performance RAID Disk Array*, CSD-95-862, Jan. 1995.
Stonebraker, Michael, et al., *The Design of XPRS*, Proceedings of the 14$^{th}$ VLDB Conference, LA, CA (1988).

Tanabe, Takaya, et al, *Redundant Optical Storage System Using DVD-RAM Library*, IEEE Symposium on Mass Storage, pp. 80-87, Mar. 1999.

Tekrom—"About RAID 6".

Tweten, David, *Hiding Mass Storage Under UNIX: NASA's MSS-H Architecture*, IEEE Symposium on Mass Storage, pp. 140-145, May 1990.

Wilkes, John, et al., *The HP AutoRAID hierarchical storage system*, ACM Transactions on Computer Systems, Feb. 1996, vol. 14, pp. 108-136.

Gibson, Garth A., et al., *Coding Techniques for Handling Failures in Large Disk Arrays*, Technical Report UCB/CSD 88/477, Computer Science Division, University of California, (Jul. 1988).

Gibson, Garth A., et al., *Failure Correction Techniques for Large Disk Arrays*, In Proceedings Architectural Support for Programming Languages and Operating Systems, Boston, Apr. 1989, pp. 123-132.

Gibson, Garth A., et al., *Strategic Directions in Storage I/O Issues in Large-Scale Computing*, ACM Computing Survey, 28(4):779-93, Dec. 1996.

Goldick, Jonathan S., et al., *Multi-resident AFS: An Adventure in Mass Storage*, In Proceedings of the 1995 USENIX Technical Conference, pp. 47-58, Jan. 1995.

Graham, Susan L., et al., *Massive Information Storage, Management, and Use*, (NSF Institutional Infrastructure Proposal), Technical Report No. UCB/CSD 89/493, Jan. 1989.

Gray, Jim et al., *Parity striping of disc arrays: Low-Cost Reliable Storage with Acceptable Throughput*. In Proceedings of the 16th Very Large Data Bases Conference, pp. 148-161, Brisbane, Australia, 1990.

Grimes, DW Martinez, *Two Dimensional Parity Error Correction Procedure*, IBM Technical Disclosure Bulletin 2686-2689, Oct. 1982.

Grimes, DW Martinez, *Vertical Parity Generator for Two Dimensional Parity*, IBM Technical Disclosure Bulletin 2682-2685, Oct. 1982.

Hellerstein, Lisa, et al,. *Coding Techniques for Handling Failures in Large Disk Arrays*. In Algorithmica vol. 2, Nr. 3, 182-208 (1994).

Hughes, James, et al., *High Performance RAIT*, Tenth NASA Goddard Conference on Mass Storage Systems and Technologies and Nineteenth IEEE Symposium on Mass Storage Systems, Adelphi, Maryland, USA, Apr. 2002.

Johnson, Theodore, et al, *Tape Group Parity Protection*, IEEE Symposium on Mass Storage, pp. 72-79, Mar. 1999.

Katz, Randy H. et al., *Disk System Architectures for High Performance Computing*, undated.

Kent, Jack et al., Optimizing Shadow Recovery Algorithms, *IEEE Transactions on Software Engineering*, 14(2):155-168, Feb. 1988.

\* cited by examiner

TREE OBJECT 800

- TYPE 802
- NAME 804
- RANGE 806
- FREEZE_ID 808
- ACTIVE_IOS 810
- STATE 812
- CONTEXT 814
- PENDING LIST 816

FIG. 8

TECHNIQUE FOR COHERENT SUSPENSION OF I/O OPERATIONS IN A RAID SUBSYSTEM

CROSS-REFERENCE TO RELATED APPLICATION

The present invention is related to the following co-pending and commonly assigned U.S. patent application Ser. No. 10/105,039 titled Method and Apparatus for Runtime Resource Deadlock Avoidance in a RAID System, Ser. No. 10/105,078 titled Method and Apparatus for Decomposing I/O Tasks in a RAID System, and Ser. No. 10/105,079 titled, Method and Apparatus for Resource Allocation in a RAID System, each of which was filed on Mar. 21, 2002.

FIELD OF THE INVENTION

The present invention relates to storage systems and, more specifically, to a technique for coherently suspending input/output (I/O) operations in RAID subsystem of a storage system.

BACKGROUND OF THE INVENTION

A storage system typically comprises one or more storage devices into which data may be entered, and from which data may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes", defining an overall logical arrangement of disk space. The disks within a volume are typically organized as one or more groups, wherein each group is operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information with respect to the striped data. The redundant information may thereafter be retrieved to enable recovery of data lost when a storage device fails.

In the operation of a disk array, it is anticipated that a disk can fail. A goal of a high performance storage system is to make the mean time to data loss as long as possible, preferably much longer than the expected service life of the system. Data can be lost when one or more disks fail, making it impossible to recover data from the device. Typical schemes to avoid loss of data include mirroring, backup and parity protection. Mirroring stores the same data on two or more disks so that if one disk fails, the "mirror" disk(s) can be used to serve (e.g., read) data. Backup periodically copies data on one disk to another disk. Parity schemes are common because they provide a redundant encoding of the data that allows for loss of one or more disks without the loss of data, while requiring a minimal number of disk drives in the storage system.

Parity protection is used in computer systems to protect against loss of data on a storage device, such as a disk. A parity value may be computed by summing (usually modulo 2) data of a particular word size (usually one bit) across a number of similar disks holding different data and then storing the results on the disk(s). That is, parity may be computed on 1-bit wide vectors, composed of bits in pre-determined positions on each of the disks. Addition and subtraction on 1-bit vectors are an equivalent to exclusive-OR (XOR) logical operations; these addition and subtraction operations can thus be replaced by XOR operations. The data is then protected against the loss of any one of the disks, or of any portion of the data on any one of the disks. If the disk storing the parity is lost, the parity can be regenerated from the data. If one of the data disks is lost, the data can be regenerated by adding the contents of the surviving data disks together and then subtracting the result from the stored parity.

Typically, the disks are divided into parity groups, each of which comprises one or more data disks and a parity disk. The disk space is divided into stripes, with each stripe containing one block from each disk. The blocks of a stripe are usually at equivalent locations on each disk in the parity group. Within a stripe, all but one block contain data ("data blocks") with the one block containing parity ("parity block") computed by the XOR of all the data. If the parity blocks are all stored on one disk, thereby providing a single disk that contains all (and only) parity information, a RAID-4 implementation is provided. If the parity blocks are contained within different disks in each stripe, usually in a rotating pattern, then the implementation is RAID-5. The term "RAID" and its various implementations are well-known and disclosed in A Case for Redundant Arrays of Inexpensive Disks (RAID), by D. A. Patterson, G. A. Gibson and R. H. Katz, Proceedings of the International Conference on Management of Data (SIGMOD), June 1988.

The storage operating system of the storage system typically includes a RAID subsystem that manages the storage and retrieval of information to and from the disks in accordance with input/output (I/O) operations. Configuration management in the RAID subsystem generally involves a defined set of modifications to the topology or attributes associated with a storage array, such as a disk, a RAID group, a volume or set of volumes. Examples of these modifications include, but are not limited to, disk addition, disk failure handling, volume splitting, volume online/offline and changes to (default) RAID group size or checksum mechanism.

In order for certain types of configuration management operations to work correctly, it is necessary to ensure that no concurrent I/O operations are underway (i.e., "in flight") in the RAID subsystem. I/O operations typically have "knowledge" of the RAID topology, which is often embedded into the state associated with individual I/O operational units or I/O tasks. A change to the topology while these tasks are processing data can have an undefined, possibly damaging, effect. One approach to ensuring that no in flight operations are executing during configuration management is to make each type of I/O operation "inspect" the configuration state each time it is restarted after a suspension in order to determine whether changes have occurred. In this context, "suspension" denotes cooperative deferral of processing of an I/O operation based on a condition. The problem with this approach is that "guarding" for a configuration change in each type of I/O operation, given that certain operations log information or have partially committed state, is difficult and error prone.

SUMMARY OF THE INVENTION

The present invention overcomes the disadvantages of the prior art by providing a technique for coherently suspending input/output (I/O) operations in a RAID subsystem of a storage system. A configuration tree of the RAID subsystem has a plurality of objects representing a logical configuration, e.g., a volume or RAID group, of storage devices coupled to the system. According to the technique, a "freeze" condition may be imposed on an object of the configuration tree to suspend I/O operations directed to that object. In order to freeze, I/O operations underway ("in flight") in the RAID subsystem and directed to the object need to complete sufficiently so as to reach a recoverable state in the event the subsystem subsequently fails prior to an I/O restart procedure. Here, a recoverable state denotes maintaining information needed to restart a suspended operation at a later time in a coherent, stable manner. Once a freeze condition has been imposed, new I/O requests directed to the object are inserted onto a freeze list of pending requests at the RAID subsystem and are blocked from processing until the object is "unfrozen" (i.e., the freeze condition is lifted).

In the illustrative embodiment, the freeze technique is invoked by specific operations, such as configuration management operations or file system operations, through requests to freeze and unfreeze RAID objects at various levels of the configuration tree. Accordingly, the freeze condition can be directed to a small or large portion of the RAID subsystem, depending upon the scope of the specific operation. This allows I/O operations to proceed through other portions of the RAID subsystem, while changes occur to the affected portion of the subsystem. For example, the inventive technique can impose a freeze condition at a RAID group object of a configuration tree for a volume. Since the volume may include many RAID groups, a freeze condition imposed at a particular RAID group object level still allows I/O activity to proceed through other RAID groups of the volume. Although the freezing granularity is illustratively described at the object level, an alternate embodiment may include freezing at a block number range associated with a RAID object.

The present invention utilizes object-based accounting procedures to determine whether there is concurrent, in flight I/O activity directed to an object when a freeze condition is imposed in response to, e.g., a configuration management operation. If there is concurrent I/O activity, a set of condition variables is used to prevent new access to the object pending completion or suspension of the in flight I/O operations. The accounting procedures are invoked each time an I/O task (embodied as a "raidio" structure) is instantiated, incrementing per-object and per-volume I/O activity counters upon entry (i.e., initiation) of processing of the raidio structure, and decrementing the per-object and per-volume activity counters upon exit (i.e., completion) of processing. When the accounting procedures indicate that all in flight I/O operations have completed sufficiently, the freeze is declared successful and the configuration management operation proceeds. When the configuration management operation completes, the object is unfrozen and I/O requests targeted to the object are restarted.

Advantageously, the present invention imposes correctness without fundamental changes or intricate special casing to I/O operation implementations. The novel technique also prevents data corruption and incorrect configuration changes arising from interleaving of configuration management operations with concurrent I/O activity in the RAID subsystem. Furthermore, the present invention is extensible to new I/O operation types and configuration management request types.

BRIEF DESCRIPTION OF THE DRAWINGS

The above and further advantages of invention may be better understood by referring to the following description in conjunction with the accompanying drawings in which like reference numerals indicate identical or functionally similar elements:

FIG. 8 is a schematic block diagram of a tree object of the configuration tree structure of FIG. 4.

DETAILED DESCRIPTION OF AN ILLUSTRATIVE EMBODIMENT

Figure 1:
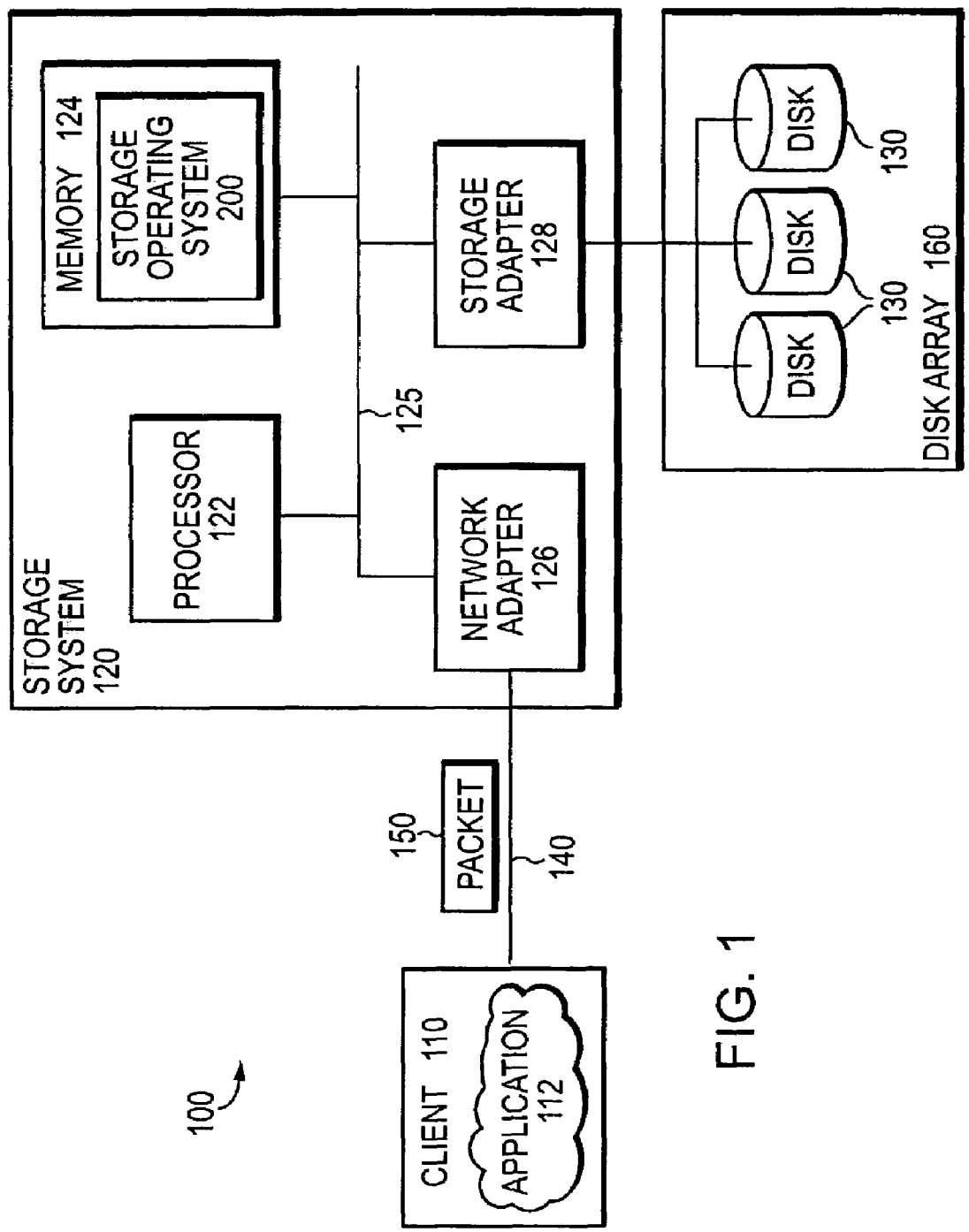
FIG. 1 is a schematic block diagram of an environment including a storage system that may be advantageously used with the present invention.

FIG. 1 is a schematic block diagram of an environment 100 including a storage system 120 that may be advantageously used with the present invention. The storage system is a computer that provides storage service relating to the organization of information on storage devices, such as disks 130 of a disk array 160. The storage system 120 comprises a processor 122, a memory 124, a network adapter 126 and a storage adapter 128 interconnected by a system bus 125. The storage system 120 also includes a storage operating system 200 that preferably implements a file system to logically organize the information as a hierarchical structure of directories, files and virtual disks (hereinafter "blocks") on the disks.

In the illustrative embodiment, the memory 124 comprises storage locations that are addressable by the processor and adapters for storing software program code and data structures associated with the present invention. The processor and adapters may, in turn, comprise processing elements and/or logic circuitry configured to execute the software code and manipulate the data structures. A storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120 to a client 110 over a computer network 140, which may comprise a point-to-point connection or a shared medium, such as a local area network. Illustratively, the computer network 140 may be embodied as an Ethernet network or a Fibre Channel (FC) network. The client 110 may communicate with the storage system over network 140 by exchanging discrete frames or packets of data according to pre-defined protocols, such as the Transmission Control Protocol/Internet Protocol (TCP/IP).

The client 110 may be a general-purpose computer configured to execute applications 112. Moreover, the client 110 may interact with the storage system 120 in accordance with a client/server model of information delivery. That is, the client may request the services of the storage system, and the system may return the results of the services requested by the client, by exchanging packets 150 over the network 140. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter includes input/output (I/O) interface circuitry that couples to the disks over an I/O interconnect arrangement, such as a conventional high-performance, FC serial link topology.

Storage of information on array 160 is preferably implemented as one or more storage "volumes" that comprise a cluster of physical storage disks 130, defining an overall logical arrangement of disk space. Each volume is generally, although not necessarily, associated with its own file system. The disks within a volume/file system are typically organized as one or more groups, wherein each group is operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of parity information with respect to the striped data.

To facilitate access to the disks 130, the storage operating system 200 implements a write-anywhere file system that cooperates with virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system including, for example, a write in-place file system may be enhanced for use in accordance with the inventive principles described herein. As such, where the term "WAFL" is employed, it should be taken broadly to refer to any storage operating system that is otherwise adaptable to the teachings of this invention.

Figure 2:
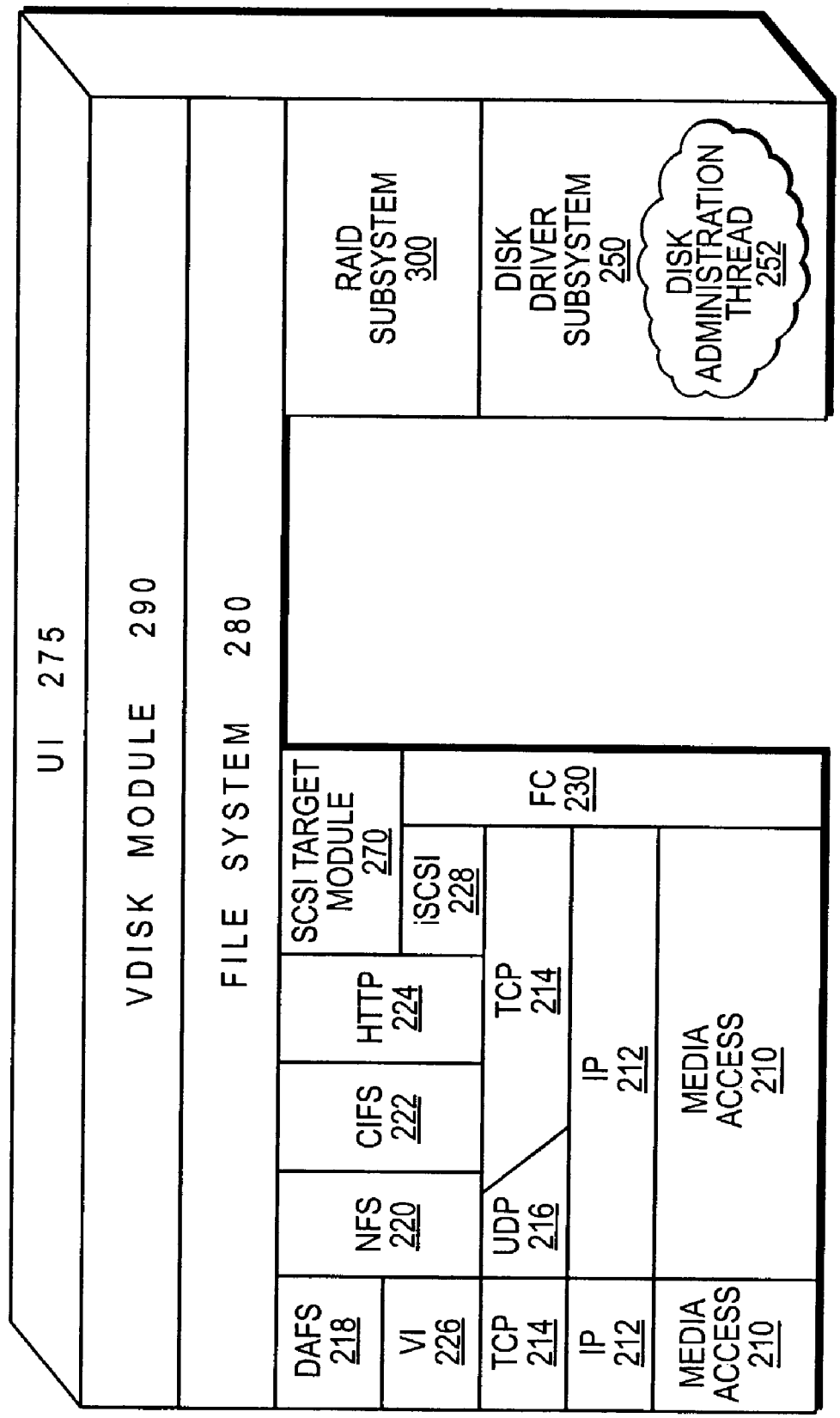
FIG. 2 is a schematic block diagram of a storage operating system that may be advantageously used with the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage device manager embodied as a RAID subsystem 300 that manages the storage and retrieval of information to and from the volumes/disks in accordance with I/O operations, and a disk driver subsystem 250 that implements a disk access protocol such as, e.g., the SCSI protocol.

Bridging the disk software layers with the integrated network protocol stack layers is a virtualization system that is implemented by a storage manager or file system 280 interacting with virtualization modules illustratively embodied as, e.g., vdisk-module 290 and SCSI target module 270. The vdisk module 290 is layered on the file system 280 to enable access by administrative interfaces, such as a user interface (UI) 275, in response to a user (system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks. The UI 275 is disposed over the storage operating system in a manner that enables administrative or user access to various layers and subsystems, such as the RAID subsystem 300.

The file system is illustratively a message-based system that provides volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system having an on-disk format representation that is block-based using, e.g., 4 kilobyte (kB) blocks and using index nodes ("inodes") to identify files and file attributes (such as creation time, access permissions, size, and block location). The file system uses files to store metadata describing the layout of its file system; these metadata files include, among others, an inode file. A file handle, i.e., an identifier that includes an inode number, is used to retrieve an inode from disk.

Operationally, a data access request from the client 110 is forwarded as a packet 150 over the computer network 140 and onto the storage system 120 where it is received at the network adapter 126. A network driver (of layer 210 or layer 230) processes the packet and, if appropriate, passes it onto a network protocol and file access layer for additional processing prior to forwarding to the file system layer 280. Here, the file system generates operations to load (retrieve) the requested data from disk 130 if it is not resident "in core", i.e., in the memory 124. If the information is not in memory, the file system 280 indexes into the inode file using the inode number to access an appropriate entry and retrieve a logical volume block number (VBN). The file system then passes a message structure including the logical VBN to the RAID subsystem 300, which maps that logical number to a disk block number (DBN) and sends the latter to an appropriate driver (e.g., SCSI) of the disk driver subsystem 250. The disk driver accesses the DBN from disk 130 and loads the requested data block(s) in memory 124 for processing by the storage system. Upon completion of the request, the storage system (and operating system) returns a reply to the client 110 over the network 140.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., file server or filer) or general-purpose computer, including a standalone computer or portion thereof, embodied as or including a storage system 120. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
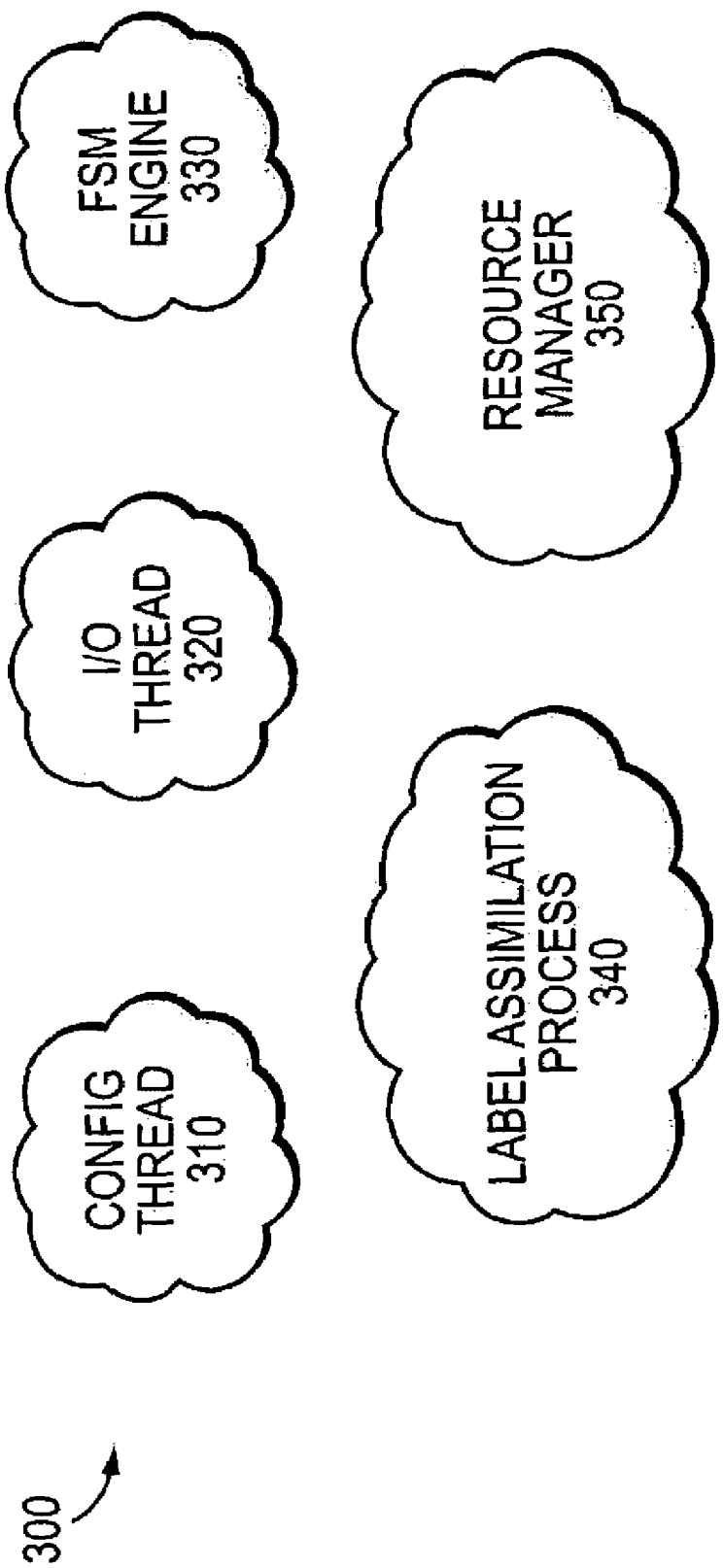
FIG. 3 is a schematic block diagram illustrating processes and threads of a RAID subsystem of the storage operating system of FIG. 2.

The present invention is implemented in the context of a configuration management framework used to implement the RAID subsystem 300 in the storage operating system 200. In a preferred embodiment, the configuration management framework provides an object-oriented approach to RAID configuration management, as described herein with respect to an implementation of the RAID subsystem. FIG. 3 is a schematic block diagram illustrating one or more modules or processes and threads of the RAID subsystem 300, wherein each process has, among other things, a (virtual) memory address space, executable code and data. A process is started with a single thread, but can create additional threads from any of its threads. The threads execute in the same memory address space and can therefore work concurrently on shared data. For example, an instantiator module implements a configuration (config) thread 310 adapted to maintain relationships among and invoke behaviors of decomposed software components ("RAID objects") that collectively form the behaviors associated with a collection of (RAID) volumes on the storage system. In addition, an I/O manager module implements an I/O thread 320 configured to issue I/O transaction requests from the RAID subsystem to the disk driver subsystem and, upon completion, process the results.

A finite state machine (FSM) module or engine 330 is used to arbitrate a set of events and states that a process or thread of the RAID subsystem may encounter. Transactional semantics isolate the behavior of state changes in the RAID subsystem from concurrent I/O operations. The framework provides a two-phase commit procedure, coordinated with updates to on-disk configuration data ("labels"). Errors during disk label updates are handled by aborting the transaction, releasing partially committed data and unwinding any pending state transitions. A state notification mechanism integrated with the FSM engine 330 propagates state changes through the threads in order to provide a coordinated behavior.

According to the configuration management framework, a volume comprises the aggregate behavior of a number of RAID objects. Each RAID object ("object") comprises operational code and static state, such as configuration information, relating to the topology of the underlying physical storage devices, e.g., disks 130, contained in disk array 160. The objects are organized into a configuration tree with configuration interfaces defining a set of services provided by one or more processes of the RAID subsystem. Although the objects may be implemented in accordance with an object-oriented programming paradigm, the present invention is not limited to such an implementation. More broadly, the objects of the configuration tree refer to abstract entities representing a logical combination/configuration of the disks. That is, the objects are used to present a view of the underlying topology of the storage array managed by the RAID subsystem.

Figure 4:
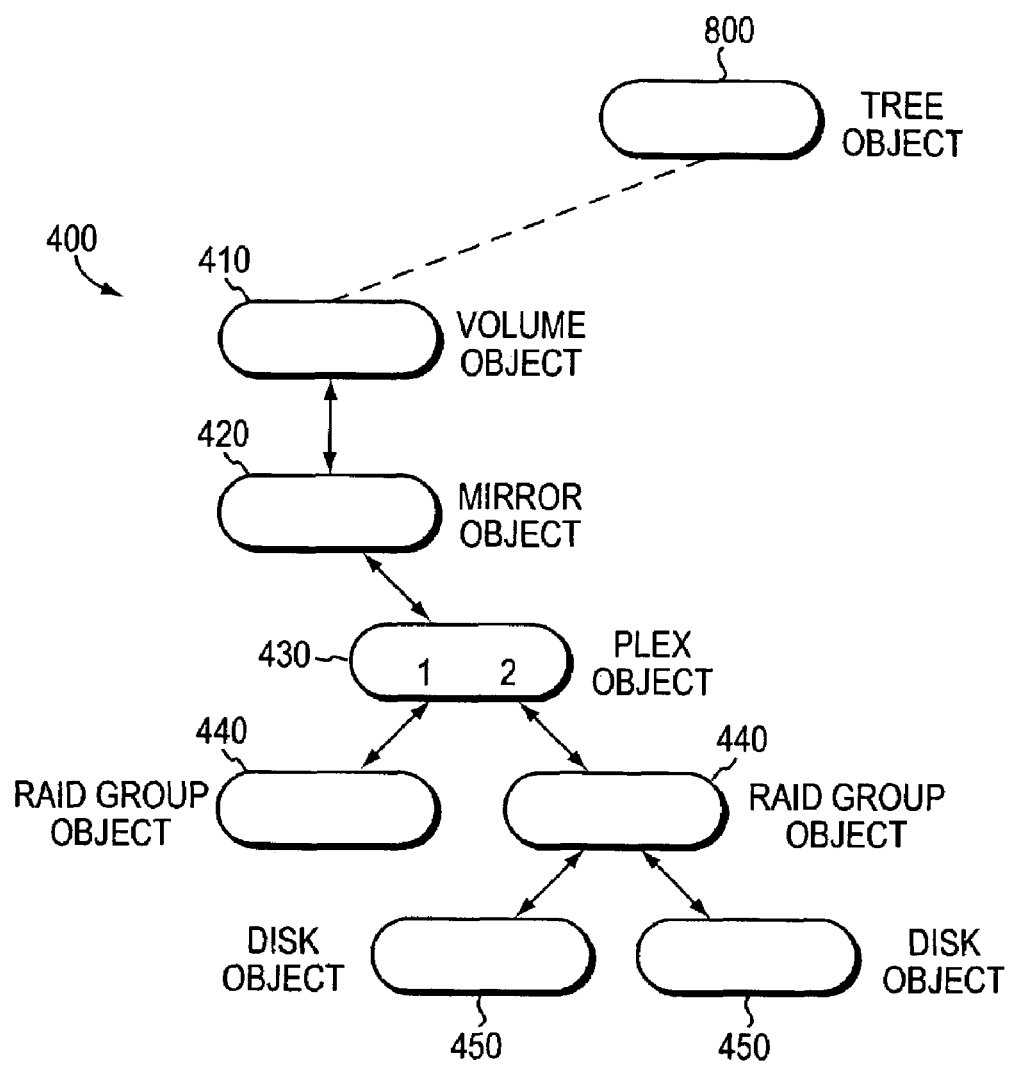
FIG. 4 is a schematic block diagram of an in core representation of a RAID configuration tree structure in accordance with a configuration management framework that may be advantageously used with the present invention.

FIG. 4 is a schematic block diagram of an in core representation of a RAID configuration tree structure 400 in accordance with the configuration management framework. The configuration tree 400 comprises a plurality of objects arranged by the RAID subsystem into levels that cooperate to organize one or more physical disks into a single logical volume. References between objects (e.g., between a superior "parent" object and each of its subordinate "children" objects) are bi-directional memory address pointers that enable each child to reference its parent (and vice versa). These pointers are part of the metadata stored within each of the objects.

Objects have an associated type, with each object type providing its own implementation of the configuration interfaces. A volume is organized into a hierarchical configuration tree of objects that includes a tree object 800 responsible for coordinated behavior with the file system and a volume object 410 responsible for managing the RAID aspects of volume management. Specifically, the volume object 410 represents the (WAFL) file system at the highest level (i.e., root node) of the configuration tree 400. To that end, the volume object 410 stores metadata that describes a volume/file system, wherein the metadata includes information such as the name of the volume and address range (in physical blocks) of the volume. The name of the volume resides in a volume namespace that is exported by the UI 275 of the storage operating system 200. The logical address space of the file system is mapped to the physical (block) address space in the RAID subsystem 300.

The configuration tree 400 and, in particular, the volume object 410 represent a logical disk that is presented to the file system by the RAID subsystem as a "container" for the file system to store its data. That is, the objects of the configuration tree are organized to create an address space that resembles a single logical disk but, in reality, comprises a plurality of physical disks. In this context, the volume object 410 is equivalent to the tree object 800, wherein the tree object stores additional metadata about the logical volume that is presented to the file system. As described herein, this additional metadata includes the type (level) of parity implementation configured for the particular volume (e.g., RAID-4, RAID-0, mirror_RAID-4, mirror_RAID-0, row-diagonal parity). Since the tree object is a one-to-one representation of the volume, the additional metadata stored in the tree object includes redundant information about the volume, such as its name and physical address/block range.

A next object level comprises a mirror object 420 that is responsible for coordinating one or more copies of the volume (termed "plexes") in support of data mirroring. In synchronous data mirroring, two "mirror" copies are provided that are at all times synchronized. That is, changes to the data in one mirrored copy are immediately reflected in the other mirrored copy. The two identical mirrored copies have matching address spaces that are within the volume address space and that provide identical synchronized full copies of the data in the volume.

A plex object 430 is responsible for managing an instance of a copy of volume data and thus represents each mirrored copy within another object level of the configuration tree. Whereas the mirror object 420 stores metadata that is used to coordinate one or more copies (or plexes) of the volume in support of data mirroring, each plex object 430 stores metadata that is used to manage an instance of a copy of volume data. The plex object may include an ordinal placement (e.g., 1, 2) indicating that, for example, a first part (1) of the address space is associated with a particular RAID group and that a second part (2) of the address space is associated with another RAID group.

A next object level comprises one or more RAID group objects 440 per plex object. Each RAID group object 440 contains metadata that provides data protection and I/O coordination over a set of disks. The metadata of the RAID group object includes information such as the number of disks within the RAID group and the address (block) range of each disk within the RAID group. In this context, a RAID group is defined as a number of disks and the address/block space associated with those disks. Finally, there is another object level comprising one or more disk objects 450 per RAID group object, wherein each disk object 450 contains metadata that provides data access to the physical disks 130.

The configuration tree 400 is constructed in the memory 124 of the storage system 120 by a label assimilation process 340 of the RAID subsystem 300. According to the assimilation process, each disk associated with a volume includes a label that describes its placement and association with that volume. The label is, in essence, self-describing information for each disk that is actively attached to the storage system 120. The labels are used to dynamically construct a configuration tree 400 for each volume, starting from the disk object level up to the volume object level. Therefore, a label on a disk identifies that disk's participation in a RAID group and, furthermore, that group's association with plex, mirror and, ultimately, volume objects in the configuration tree. The label is stored in a well-known location of the disk so that it can be queried by the RAID subsystem in accordance with, e.g., a discovery process during a boot operation.

Each object type instance of the configuration tree 400 comprises the following components: service interfaces, committed transactional state, pre-committed transactional state and non-transactional state. The service interfaces comprise an application programming interface (API) that the object exports to other software components. In the illustrative embodiment, the service interfaces include initialization and destruction, child object management (add, replace), online/offline, transaction management (join, commit, abort, label I/O, state change notify), virtual block management, and I/O handling (context creation/deletion, resource management, I/O throttling). Each object type defines the commit, pre-committed, and non-transactional state that it holds. The transaction management interfaces are provided as a mechanism to create and modify transactional state in a manner that is coordinated across all objects in a volume.

The basic flow of control starts with a configuration management operation issued by, e.g., the file system 280 and received by the RAID subsystem 300. The file system passes the configuration management operation in the form of a message request that specifies a target volume and defines a named operation with specific parameters. The configuration thread 310 of the RAID subsystem receives the request and determines the object (e.g., volume, RAID group) of the configuration tree 400 for the volume to which the request is directed. The configuration thread then locates the tree object 800 for the volume and invokes relevant configuration operations using service interfaces of the appropriate object. When a service interface is invoked, the object is transparently "joined" to the request prior to activation of the interface. Joining of an object to a request results in copying of the currently committed state into a pre-committed state area (called the "trans" area of the object). The trans area is a portion of memory that records changes to the object that are pending commitment. The service interface makes its changes to the trans area. If the changes to the object result in a change of the state of the object, the FSM engine 330 is invoked.

The FSM engine 330 provides a critical component in managing the interrelationship between objects in a RAID volume. Specifically, the FSM engine defines the state/event pairs that are "legal" and, for each state/event, provides a mechanism to implement the invocation and determine any subsequent state transitions. In addition, the FSM engine provides tracing mechanisms to track the set of transitions that have occurred and provides object notification for pre-committed and committed state transitions. More specifically, the FSM engine 330 is responsible for determining the new state of the object (based upon a per object type state/event table) and invoking the state notification interface of its superior object in the volume hierarchy.

When the configuration request completes all service interface invocations, it requests a label commit operation to persistently store the modified state. The label commit "pulls" data from the trans area in order to construct its new version of the label data. Label commit is deemed to be successful only if all labels in a plex can be successfully written. Once all labels have been successfully written, each object that has been joined to the request is responsible for copying its trans area data back to the committed state portion of the object. If labels are not successfully written, the trans area is discarded, any disk failures are identified and resulting configuration changes are initiated, the successfully written labels are re-written with the previous state, and the original configuration request is retried.

Figure 5:
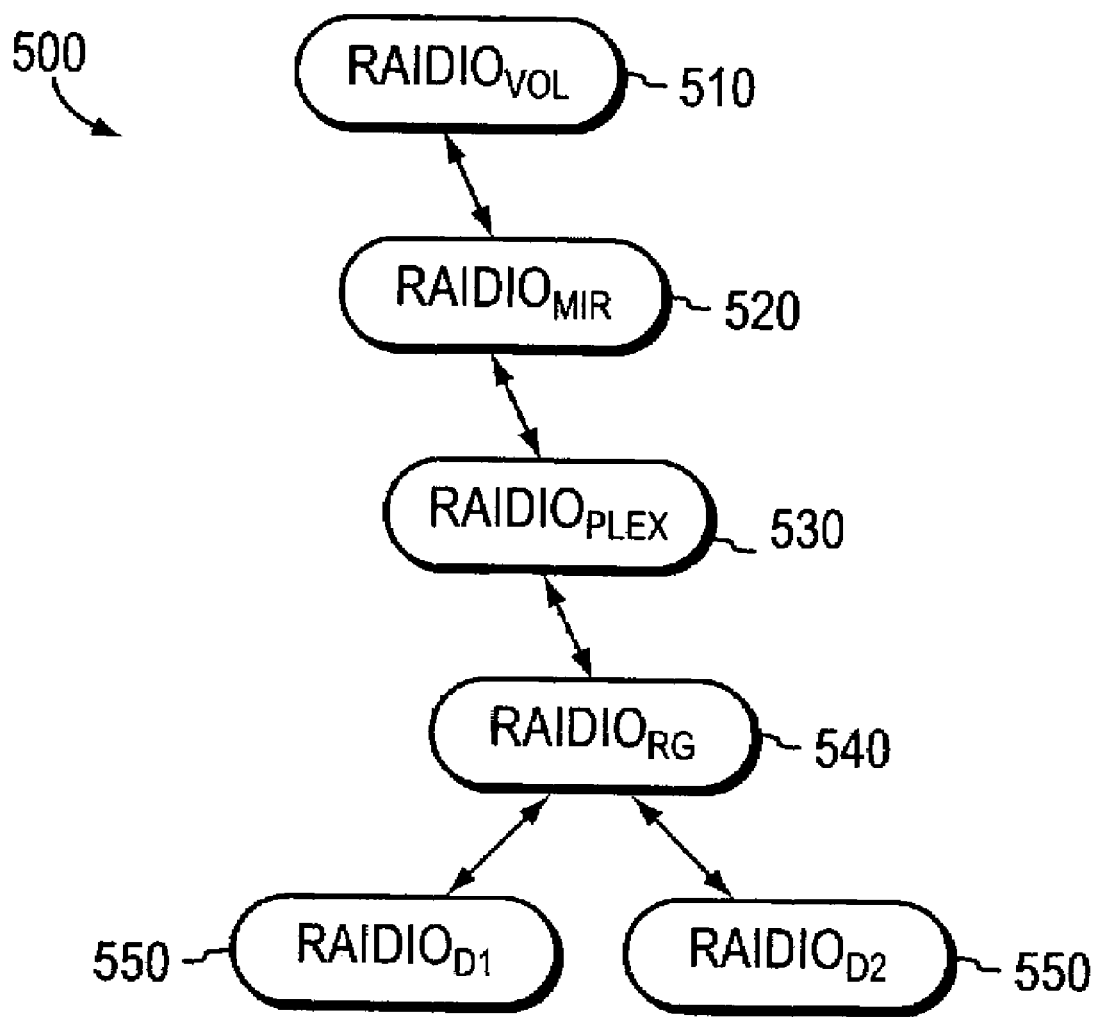
FIG. 5 is a schematic block diagram of an in core representation of a RAID I/O tree structure in accordance with the configuration management framework.

FIG. 5 is a schematic block diagram of an in core representation of a RAID I/O tree structure 500 in accordance with the configuration management framework. The I/O tree 500 comprises the I/O infrastructure of the RAID subsystem 300 that accommodates I/O operation "flow" through the subsystem and targeted to a volume. The I/O operation flow arises from, e.g., data access requests to store and retrieve information to and from the disks. The I/O thread 320 interacts with the I/O tree 500 to implement an I/O task architecture for processing these data access requests. An example of an architecture that decomposes I/O tasks in a RAID subsystem is described in pending U.S. patent application Ser. Nos. 10/105,078 titled Method and Apparatus for Decomposing I/O Tasks in a RAID System, which application is hereby incorporated by reference as though fully set forth herein.

The I/O tree 500 is similar to the configuration tree 400 with the exception that instead of objects in the configuration tree, the I/O tree comprises various I/O task or "raidio" structures. The raidios contain object-specific information about the I/O operation flow with respect to the topology of the RAID I/O infrastructure (I/O tree); as a result, these raidio structures are processed in the context of (in reference to) their corresponding RAID objects. As described herein, each raidio structure of the I/O tree 500 has a reference to a corresponding object of the configuration tree 400 that allows the raidio to perform a type of I/O operation on that corresponding object. For example, when writing data to a volume, disk-level and RAID group-level raidio structures are created, each of which "points to" (references) corresponding disk and RAID group objects of the configuration tree. The configuration thread 310 instantiates the raidio structures in response to superior raidio structures calling a function in the corresponding objects that generate new instances of the subordinate raidio structures. Here, each subordinate raidio "inherits" one or more properties from its superior raidio structure.

Each raidio structure is embodied as a triple comprising (i) a set of behavioral function vectors, (ii) instance data and (iii) a reference to a RAID object instance. The behavioral function vectors are invoked to collectively perform some task or operation, e.g., write a stripe of blocks on the disks. These function vectors are illustratively memory pointers that reference program code used to implement specific operations. Each raidio includes a series of function vectors that reference different operations. For instance, each raidio structure includes a function vector to start an operation; however, depending upon the type of raidio, the start function may be different among the radio structures. That is, the start function for a raidio structure used to write a stripe of a volume is different than a start function for a raidio used to write only one disk. The instance data maintains a current state of the operation, including memory and variables, superior and subordinate raidio structures. The reference to the RAID object instance, e.g., an object representing a RAID group instance, defines the scope on which the operation is performed. This reference is illustratively embodied as a destination identifier (ID) comprising an identifier, such as a pointer or memory address linking the raidio to a corresponding object of the configuration tree.

Figure 6:
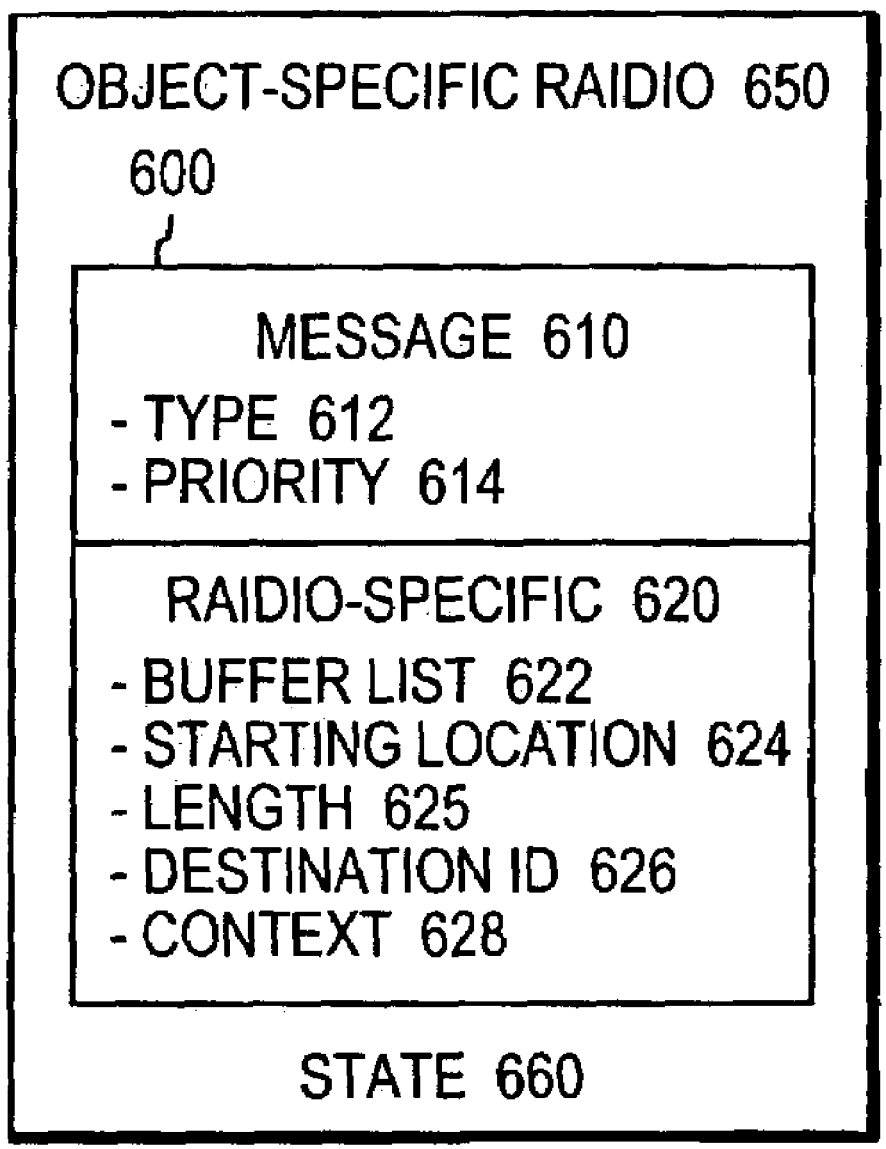
FIG. 6 is a schematic block diagram illustrating a raidio message structure that may be advantageously used with present invention.

FIG. 6 is a schematic block diagram of an illustrative raidio message structure 600 that includes a message section 610 and a raidio-specific data section 620. The message section 610 includes information about the type 612 of requested operation (read or write) and the priority 614 of the operation. In the illustrative embodiment, the file system 280 determines the priority of the I/O requests issued to the RAID subsystem and conveys that priority within the message requests issued to the subsystem. I/O requests are illustratively stored by priority within priority bands, embodied as queues, which are accessible by the RAID subsystem. In general, ordering is maintained within the priority bands although, among priority bands, subsequently issued I/O requests having higher priority can be allowed to process over suspended I/O operations of lower priority. Moreover, priority band processing can be altered based on aging of the requests in the bands, e.g., as a result of a prolonged suspension period.

The raidio-specific data section 620 includes context information, such as a buffer list 622 of, e.g., pointers to 4 k buffers needed to accommodate the type of request, a starting (DBN) location 624 on a particular disk to which the request is targeted and a length 625 of the buffer "chain" provided in the buffer list. Although the size of the buffers in the list 622 is fixed (4 k), the length 625 of the buffer chain may vary depending upon the type of operation, as will whether the operation spans one disk (which is likely for a read operation) or multiple disks (which is likely for a write operation). The raidio-specific data section also includes a destination ID 626 comprising, as noted, an identifier of an object within a configuration tree 400 to which the communication is directed and other context information 628.

The raidio structure 600 is encapsulated within an object-specific raidio structure 650 that further includes object-specific information, such as state information 660 specifying context with respect to actions that have completed (e.g., suspend or restart). An example of an object-specific structure 650 is a volume radio structure (raidio$_{vol}$). A handle of the encapsulated raidio structure is used as a queuing mechanism onto the I/O thread 320 (or, more specifically, a receive list 700 of the I/O thread) in the RAID subsystem 300. Examples of raidio handles include the raidio$_{vol}$ structure 510 that is destined for a volume object 410 of the configuration tree 400, a raidio$_{mir}$ structure 520 that is destined for a mirror object 420, a raidio$_{plex}$ structure 530 that is destined for a plex object 430, a raidio$_{rg}$ structure 540 that is destined for a RAID group object 440 and a raidio$_{disk}$ structure 550 that is destined for a disk object 450.

As described herein, a raidio structure 600 is allocated in response to a RAID I/O message request that is issued (driven) by either the (WAFL) file system or internally within the RAID subsystem 300 to initiate an I/O operation on a particular object, such as a volume object 410, of the configuration tree 400. Examples of file system driven I/O requests are read and write requests, whereas an internally driven I/O request manifests as a "long-running" operation, such as a mirror resynchronization ("resync") operation or disk reconstruction operation. The I/O tree 500 is illustratively constructed in response to issuance of the RAID I/O request to communicate with the particular object of the configuration tree 400. As the request "descends down" the I/O tree 500, it manifests as operations directed to objects of the configuration tree 400. The RAID I/O request eventually transitions to a disk I/O request directed to the disk driver subsystem 250 of the storage operating system 200.

For example, assume a client data access request to, e.g., write data to a particular file is forwarded from client application 112 to the storage system 120. The request is received at the network protocol stack of the storage operating system and is passed to the file system 280, where it is transposed into a buffer that is encapsulated by a RAID I/O request. In particular, the write request is forwarded to write allocation code of the file system that arranges (i.e., "lays out") the data for storage on the disks. The RAID subsystem provides topology information to the file system about, e.g., disks of RAID groups that allow the write allocation code to render optimal write allocation decisions. As noted, messages are used to communicate between the file system and other subsystems of the storage operating system.

The user data access (write) request is thus issued by the file system 280 as a RAID I/O message request to the RAID subsystem that traverses down the I/O tree 500 to the disk driver subsystem 250. The disk driver subsystem stores the user data at the appropriate location(s) on the disk(s). In contrast, an internally driven I/O request ("a long-running" operation), such as a mirror resync, is initiated by a mirror object 420 of the configuration tree 400 by issuing a RAID I/O "resync" request that manifests as both read and write requests. That is, the read request traverses one "leg" of the I/O tree 500 to the disk driver subsystem 250 and the retrieved data is then utilized in a write request that traverses the other leg of the I/O tree to thereby synchronize both legs of the "mirror".

The RAID subsystem 300 is illustratively a "resource driven" subsystem, as opposed to a priority driven subsystem. To that end, the RAID subsystem implements a "just in time" resource allocation arrangement, an example of which is described in pending U.S. patent application Ser. Nos. 10/105,079 titled Method and Apparatus Resource Allocation in a RAID System, and 10/105,039 titled Method and Apparatus for Runtime Resource Deadlock Avoidance in a RAID System, which applications are hereby incorporated by reference as though fully set forth herein. The I/O thread 320 constantly retrieves the various types of raidio structures from receive list 700 in accordance with a suspend/restart processing model of the RAID subsystem. These various types of raidio structures control a throttling mechanism of the RAID subsystem.

Specifically, the raidios are utilized in the resource driven model to "throttle" I/O message requests issued to the RAID subsystem. There are a fixed number of resources in the RAID subsystem; for example, there are a fixed number of specific raidio structure (raidio$_{vol}$) resources directed to a volume object. Notably, there is a particular raidio structure for each object of the configuration tree 400. If a user request is received at the RAID subsystem and a raidio$_{vol}$ is not available for allocation to that request, then the request must wait until resources are available for it to be processed by the RAID subsystem.

In response to the file system 280 issuing a RAID I/O request to communicate with, e.g., the volume object 410 in the configuration tree 400, the RAID subsystem 300 attempts to allocate a raidio$_{vol}$ structure 510. To enable communication between the file system and a particular object in the configuration tree 400, a raidio structure specific to that particular object (e.g., a raidio$_{vol}$ structure) must be allocated. A RAID resource process or manager 350 of the RAID subsystem 300 responds to the RAID I/O request to obtain the raidio$_{vol}$ structure 510. The resource manager 350 manages the allocation of resources; in the illustrative embodiment, each instance of a raidio structure is a type of resource managed by the resource manager.

Figure 7:
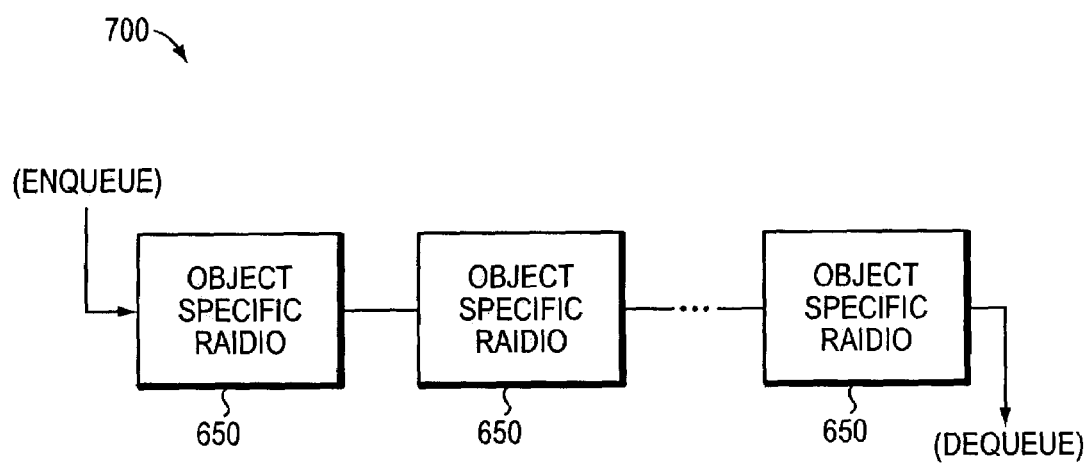
FIG. 7 is a schematic block of a receive list that may be advantageously used with the present invention.

If the raidio$_{vol}$ structure 510 is allocated by the resource manager 350, that raidio structure is forwarded to the I/O thread 320 and enqueued on the receive list 700. FIG. 7 is a schematic block of the receive (message) list 700 that may be advantageously used with the present invention. The receive list may be implemented as a queue that is accessed by the I/O thread of the RAID subsystem. Only a single receive list 700 is used by the I/O thread 320 to accommodate and process all various types of object-specific raidio structures 650 (such as the raidio$_{vol}$ structure 510). As each raidio structure is enqueued onto the receive list 700 and subsequently dequeued from that list by the I/O thread 320, that raidio structure is instantiated (in memory) within the I/O tree 500 that is constructed for the issued RAID I/O request. Once the raidio structures are instantiated, the I/O tree 500 is formed in memory (in core) and the I/O thread can proceed with processing of those instantiated structures.

Use of the receive list enables the I/O thread 320 to continuously process object-specific raidio structures 650 enqueued on the list in accordance with the suspend/restart processing model. When processing of the raidio$_{vol}$ structure 510 reaches a point that cannot progress any further, that structure is enqueued on one of many pending lists, depending on the reason for the suspension. For example, if processing is suspended for lack of a particular RAID resource, the raidio structure 510 is placed on a pending list of that resource. If processing is suspended because of a freeze condition then, as described further herein, the raidio structure is enqueued on a freeze pending list of the respective volume. Once the suspending condition has been lifted, the raidio structure 510 is enqueued on the receive list 700 so that processing of the structure 510 can be reattempted by the I/O thread 320.

When the I/O thread 320 is available ("free") to process another raidio structure, it retrieves the enqueued raidio$_{vol}$ from the receive list and begins processing that structure. As part of the processing, the I/O thread examines the type of operation 612 specified by the raidio structure and the destination ID 626 contained in the structure. In addition and as described further herein, the I/O thread determines whether processing of the raidio$_{vol}$ structure 510 is allowed (e.g., the I/O tree is not "frozen"). Processing of the operation directed to the raidio$_{vol}$ structure 510 triggers an attempt by the I/O thread 320 (in cooperation with the resource manager 350) to allocate a raidio$_{mir}$ structure 520.

If the resource manager 350 cannot allocate a raidio$_{mir}$ structure (e.g., there are no raidio resources available that are directed to a mirror object 420), the raidio$_{vol}$ structure is "restarted". In other words, the raidio$_{vol}$ structure 510 is reissued onto the receive list 700 of the I/O thread, where the I/O thread 320 will eventually retrieve it and attempt to (once again) allocate the raidio$_{mir}$ structure. If the raidio$_{mir}$ structure 520 is successfully allocated, the mirror object 420 sets up (initializes) the raidio 520 and enqueues it onto the receive list 700 for further processing by a child object.

Eventually, the I/O thread 320 retrieves the raidio$_{mir}$ structure and begins processing that structure. Retrieval (dequeuing) of a raidio structure by the I/O thread from the receive list is denoted by an arrow coupling a parent raidio structure (e.g., the raidio$_{vol}$ structure 510) to its child raidio structure (e.g., the raidio$_{mir}$ structure 520). As part of the processing of an operation directed to the raidio$_{mir}$ structure, the I/O thread attempts to allocate a raidio$_{plex}$ structure 530. If the raidio$_{plex}$ structure is successfully allocated, it is enqueued onto the receive list 700, where it is eventually dequeued and processed by the I/O thread 320.

As part of the operation processing directed to the raidio$_{plex}$ structure 530, the I/O thread cooperates with the plex object 430 to determine to which RAID group the request is directed and attempts to allocate a raidio$_{rg}$ structure 540 for that particular RAID group. Determination of the correct RAID group to which the request is directed is achieved through the use of a raidio mapping function between memory locations (buffers) holding user data associated with the request, and information describing the disks/DBN locations for storing the user data. That is, each RAID group object 440 contains an address (DBN) range associated with the disks of that group. The starting block location 624 and length 625 (along with the buffer pointer list 622) contained within a raidio structure are used to map into that RAID group DBN range to determine the appropriate RAID group for the request.

Once the raidio$_{rg}$ structure 540 is allocated and initialized, it is enqueued onto the receive list 700 and eventually dequeued and processed by the I/O thread 320. At that time, the I/O thread invokes a start function on the raidio structure. As noted, the raidio$_{rg}$ is distinguished from other types of raidio structures by the function vectors. All similarly typed raidios have the same set of function vectors; however, internal state of the raidio (such as the pointers to the memory buffers) distinguishes the particular typed raidio from other similarly typed raidios.

As further noted, the destination ID 626 provides a reference between the raidio$_{rg}$ and its corresponding configuration object, i.e., RAID group object 440 to facilitate I/O tree construction when, e.g., determining the layout of a stripe in order to perform parity computation. If a disk failure is detected during raidio processing, a configuration operation may be initiated on the corresponding object using the destination ID. Only a partial I/O tree is constructed that includes those raidio structures that are relevant to the issued RAID I/O request. If the issued RAID I/O request is a write request, any read operations associated with that write request, as well as any, e.g., non-volatile random access memory allocation/clearing operations, are performed within the context of the raidio$_{rg}$ structure.

The state 660 included within the object-specific raidio structure 650 indicates the progress of operation processing associated with the structure. For example, assume processing of the start function on the raidio$_{rg}$ structure 540 results in write operations directed to two disks. In order to process these operations, the I/O thread 320 (and resource manager) 350 attempts to allocate two "child" raidio$_{disk}$ structures 550, raidio$_{d1}$ and raidio$_{d2}$, to implement subordinate operations, such as disk Write operations. In order to avoid deadlock, either both of the requested raidio disk structures 550 are allocated or none are allocated. In either event, the operation processing progress is recorded as state 660 within the raidio$_{rg}$ structure 540.

Each disk write raidio$_{disk}$ structure references a data buffer holding user data for storage on a disk at a DBN location. In order to effect, e.g., a stripe write operation (at the raidio$_{rg}$ level), all blocks of the stripe need to be written out to the disks. The destination ID 626 of the raidio$_{rg}$ provides a reference to the corresponding RAID group object 440 of the configuration tree 400 that describes (in its static state) the number of disks in the RAID group. A determination of whether all blocks of the stripe are available is made by comparing the static state of the object with the per buffer disk/DBN information of the raidio$_{rg}$.

Assuming both raidio$_{disk}$ structures are allocated, those structures are enqueued onto the receive list 700 and eventually dequeued by the I/O thread for processing. Meanwhile, the raidio$_{rg}$ suspends until the I/O operations associated with the raidio$_{disk}$ structures complete. As each child raidio$_{disk}$ structure completes processing, it calls back to its parent (raidio$_{rg}$) via a "child done" function vector. The raidio$_{rg}$ performs a child done count on the number of subordinate disk write raidios still outstanding. When the child done count reaches zero, the raidio$_{rg}$ can be restarted with knowledge that all subordinate operations completed.

As part of the processing associated with the raidio$_{disk}$ structures, the I/O thread allocates a message that is forwarded to a disk administration thread 252 of the disk driver subsystem 250. The disk administration thread 252 then determines the appropriate disk driver for processing the request. Once the requested information (response) is returned to the RAID subsystem 300 from the disk driver subsystem 250, the response traverses the I/O tree 500 to the file system 280. As the response traverses each raidio structure of the tree, the traversed raidio structure is deallocated and "freed" for use as a resource associated with a next incoming RAID I/O request.

When constructing the I/O tree 500, a situation may arise where it is necessary to suspend I/O operation flow processing because of, e.g., the need to perform a configuration management change (operation) or the occurrence of some other event in the RAID subsystem 300. According to the present invention, a freeze technique is provided to coherently suspend I/O processing in response to a freeze request directed to an object of the RAID subsystem. I/O operations underway ("in flight") in the RAID subsystem and directed to the object may either drain or complete sufficiently so as to reach a recoverable state in the event the subsystem subsequently fails prior to an I/O restart procedure. As used herein, "draining" denotes enabling an I/O operation that has progressed beyond some predetermined state to complete, whereas a "recoverable state" denotes maintaining information needed to restart a suspended/terminated operation at a later time in a coherent, stable manner. Each raidio structure stores I/O operation information in the form of recoverable state used to ensure that the raidio may be suspended/terminated by a freeze request and restarted by an unfreeze (thaw) request. Therefore, the invention further provides a framework in which these in flight I/O operations are informed of the freeze request and are allowed to indicate when a recoverable state has been reached.

A freeze request may occur at any point during construction of the I/O tree 500, resulting in the imposition of a freeze condition not only at the directed object, but also at any raidio structures referencing that object. As noted, each raidio comprises a reference to a RAID object of the configuration tree 400. When a freeze condition is imposed at an object of the tree, all raidios that reference that object instance are themselves "frozen" through suspension or being allowed to drain (depending upon the type of freeze implementation). The freeze condition may be implemented as (i) an immediate, unconditional freeze or (ii) a coherent freeze. The RAID subsystem illustratively implements a coherent freeze condition that allows concurrent, in flight I/O operations to drain or reach a recoverable state, but does not allow any new I/O requests to start processing in the RAID subsystem. For example, any I/O operations that are in flight within the I/O tree such as, e.g., operations that are active (or processing) at a plex or RAID group level, are allowed to drain and/or proceed to sufficient completion to thereby enable freezing at a coherent point within the subsystem.

An embodiment of the invention is further directed to a coordinated freeze condition between the file system and RAID subsystem. That is, the file system determines an appropriate time to issue, e.g., a configuration management operation that manifests as a freeze request and the RAID subsystem imposes the freeze condition at that time. Examples of configuration management operations that necessitate a freeze condition include (i) parity flipping, (ii) disk fail, (iii) volume offline, (iv) plex offline, (v) negotiated failover, (vi) dynamic assimilation, and (vii) degraded mirror. For the degraded mirror example, only one of the two plexes is available. When the other plex is brought online, a determination is made as to which volume the disks of the added plex belong. Essentially a freeze condition is imposed on the degraded mirror plex object until the plex is brought online to create a mirrored volume. This example also involves augmentation of the configuration tree by adding new objects to that tree.

Once the coherent freeze condition has been imposed, new I/O requests directed to the object are inserted onto (added to) a list of pending requests for the volume at the RAID subsystem and are blocked from (not scheduled for) processing until the configuration management operation completes and the object is "unfrozen" (the freeze condition is lifted). As for the in flight operations, the I/O thread 320 selects the raidio structures from the receive list 700, examines them to determine their destination (e.g., which I/O tree) and then determines whether it can process those structures. This latter determination is made in connection with certain metadata that is stored in the tree object 800 of the configuration tree 400 and that is associated with each I/O tree 500 formed by the I/O thread.

FIG. 8 is a schematic block diagram of the tree object 800. The tree object 800 stores information (metadata) pertaining to the type 802 (level) of RAID implementation configured for a particular volume (e.g., RAID-4, RAID-0, mirror_RAID-4, mirror_RAID-0, row-diagonal parity), as well as redundant information about the volume, such as its name 804 and physical address/block (DBN) range 806. The metadata stored in the tree object further includes condition variables, such as a generation number in the form of a "freeze_id" 808 (e.g., a monotonically increasing number or value), an active I/O count ("active_ios 810") in the form of per-volume and per-object I/O activity counters, and a state 812 of the I/O tree (e.g., frozen, thawed, draining). For either a frozen or draining state, any new I/O (raidio) requests coming into the RAID subsystem as a "top level I/O" cannot proceed. In addition, the metadata includes context 814, such as an indication of the request causing the current state, and a pending freeze list 816 comprising pending raidio structures that are stopped/suspended because the I/O tree is, e.g., frozen. In the illustrative embodiment, there is one pending freeze list per volume; accordingly, the pending raidio structures are queued to the pending freeze list of the respective volume. Note that the active_ios parameter 810 (the active I/O count) may also be stored in the object at which a freeze request is initiated (as described herein).

A freeze request may be initiated by the configuration thread 310 at an object of the configuration tree 400 within the RAID subsystem as, e.g., a flow control mechanism, or in response to a user request (via the file system). An example of a user request is a request to offline a volume; it is desirable to offline a volume in a consistent state, i.e., in a state that leaves no I/O requests "hanging" within the RAID subsystem 300. Here, the freeze request is issued to freeze the volume and stop any new I/O requests from entering the RAID subsystem at the volume object 410 of the configuration tree 400. In addition, the freeze request initiates draining of any I/O requests that are in flight within the I/O tree 500 of the RAID subsystem.

In the illustrative embodiment described herein, the freeze technique is invoked by specific operations, such as configuration management operations or file system operations, through requests to freeze and unfreeze RAID objects at various levels of the configuration tree hierarchy, such as volume, mirror, plex, RAID group or disk objects. Although the freezing granularity is illustratively described at the object level, an alternate embodiment may include freezing at a block number range associated a RAID object. In essence, a freeze condition can be directed to a small or large portion of the RAID subsystem, depending upon the scope of the specific operation. This allows I/O operations to proceed through other portions of the RAID subsystem, while changes occur to the affected portion of the subsystem. For example, the inventive technique can impose a freeze condition at a RAID group object of the configuration tree. Since a volume includes many RAID groups, a freeze condition imposed at the RAID group object level still allows I/O activity to proceed through other RAID groups of the volume.

Further to the illustrative embodiment, the configuration and I/O threads administer metadata in the tree object 800. Specifically, the configuration thread examines and adjusts the freeze_id, and alters the freeze state, whereas the I/O thread administers the active_ios counters and other accounting information, such as assignment of a freeze_id to a raidio structure. For example, when the I/O thread 320 selects a raidio structure from the receive list 700, it first determines whether the raidio is assigned a freeze_id. If not, the raidio structure is a "top level I/O" and the I/O thread assigns a freeze_id to the selected raidio. Once the raidio is assigned a freeze_id, any children raidio of that raidio structure (i.e., any subordinate raidio structure that is allocated as a result of processing the selected raidio structure) inherits the freeze_id of its parent, thereby allowing identification of a "chain" of raidio operations.

In response to each freeze request received at the RAID subsystem, the configuration thread 310 increments the freeze_id 808 stored in the tree object 800 (hereinafter the "current" freeze_id). If the freeze_id of a raidio structure dequeued from the receive list 700 is less than the current freeze_id and if the state of the I/O tree is "frozen" or "draining", the I/O thread is allowed to process that dequeued raidio structure. Thus, any children raidio of a raidio chain that are instantiated from a parent raidio inherit the freeze_id of their parent and are allowed to proceed with processing. This essentially enables draining of the in flight I/O operations. Otherwise, if the dequeued raidio has a freeze_id that is greater than or equal to the current freeze_id, processing of that raidio structure is suspended and that raidio is placed on the pending freeze list 816 for that I/O tree. When the state of the I/O tree transitions to "thawed", all raidio structures enqueued on the pending list are reissued for enqueuing onto the receive list 700 of the I/O thread for subsequent processing.

Figure 9A:
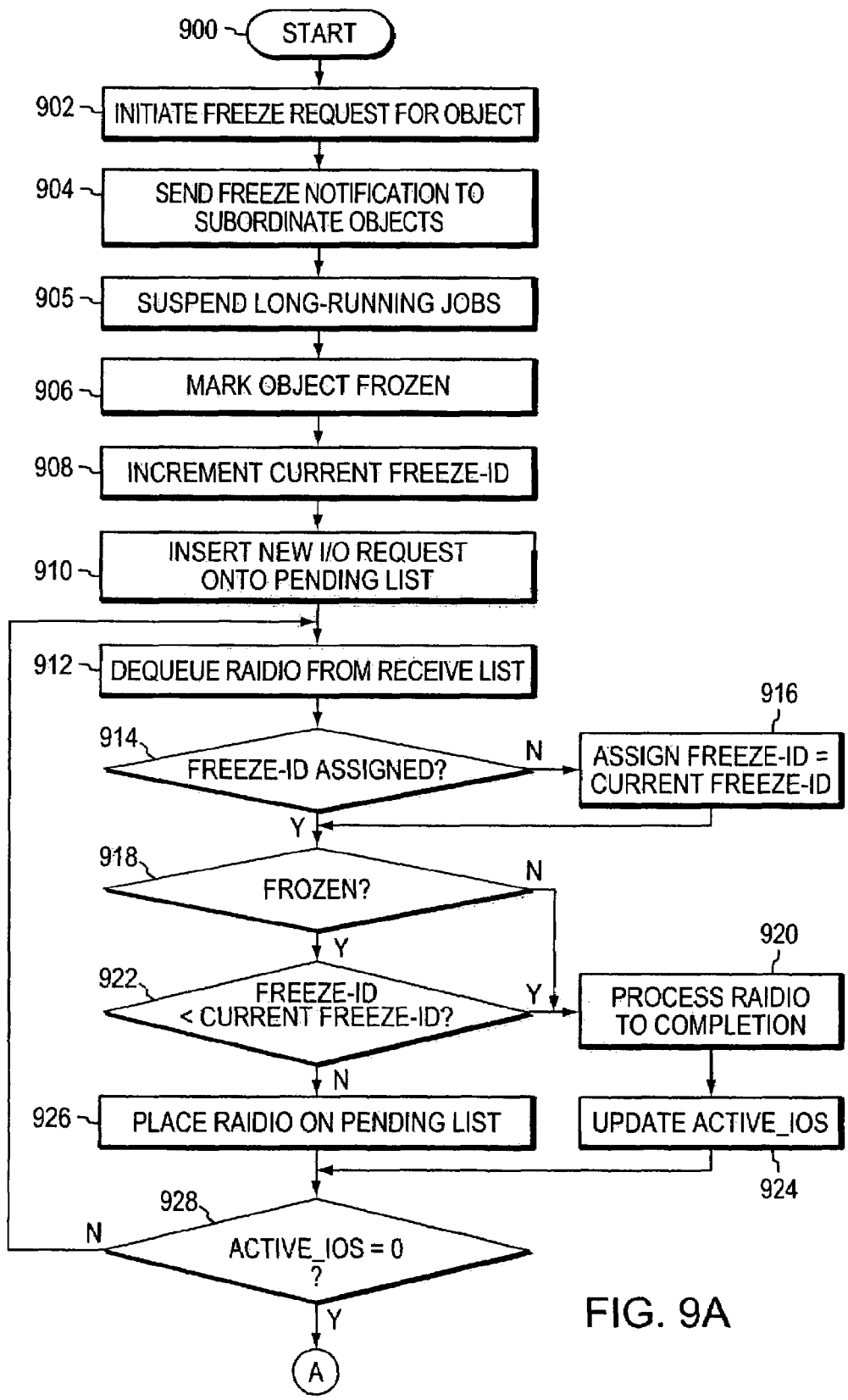
FIGS. 9A and 9B are flowcharts illustrating a sequence of steps involved in suspending I/O operations executed by the RAID subsystem in a coherent manner.
Figure 9B:
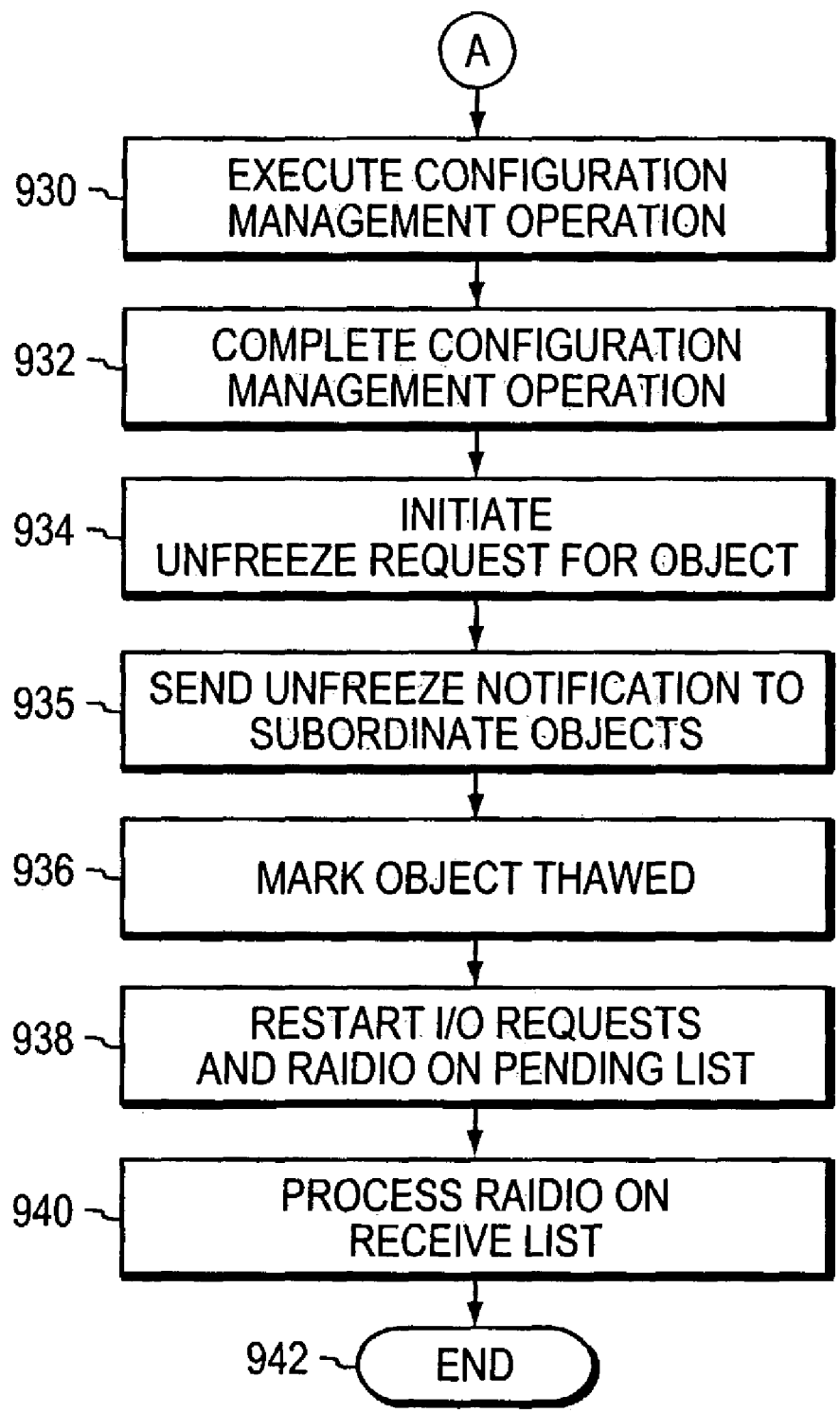

FIGS. 9A and 9B are flowcharts illustrating a sequence of steps involved in suspending I/O operations executed by a RAID subsystem in a coherent manner. I/O suspension is needed to prevent data corruption due to concurrent I/O activity in the RAID subsystem during execution of, e.g., a configuration management operation initiated by a user (via the file system) and directed to a particular object of the subsystem. To that end, a freeze condition may be imposed to suspend I/O operations directed to the object of the configuration tree. The configuration management operation is not started until all pending in flight I/O operations that have progressed to a predetermined state have completed. I/O operations that have not reached that state are blocked (suspended). The I/O operations/requests that are blocked are stored on the pending freeze list 816 based, e.g., on priority.

In the illustrative embodiment, there may be many priority queues of different priorities used by the RAID subsystem for storing I/O requests received from the file system. However, there is only one pending list 816 employed by the I/O thread in the context of freeze. Priority can be integrated with the pending freeze list 816 by, e.g., restarting higher priority requests/operations before lower priority ones. Yet, priority integration must comport with an anti-starvation feature of the inventive technique that dictates suspended I/O operations execute before any new I/O requests received at the RAID subsystem. This is because the suspended I/O operations (raidios) have been allocated resources, whereas the newly received I/O requests have not.

As noted, the RAID subsystem is decomposed into a hierarchy of objects (configuration tree) and raidios (I/O tree) within the configuration management framework that provides a binding between an I/O operation (raidio) and a configuration object on which the raidio operates. The freeze condition is thus imposed over the directed configuration object as well as all raidio structures operating on that object. The freeze condition is further "implicitly" directed to raidio structures that reference subordinate (child) objects "underneath" the directed object in the configuration tree. The freeze condition is imposed prior to execution of the configuration management operation with the duration of the freeze defined by the length of the management operation.

The sequence starts at Step 900 and proceeds to Step 902 where the configuration thread 310 initiates a freeze request in response to the configuration management operation targeted for an object of the configuration tree. Specifically, the file system passes the configuration management operation in the form of a message request to the configuration thread, which determines at which object level (e.g., volume, mirror, RAID group) that request is directed. All configuration management message requests are passed from the file system (or UI) to the configuration thread. The configuration thread 310 then passes the freeze request to the directed object.

Upon receiving the freeze request, the object sends a freeze notification call to all subordinate (children) objects in the tree (Step 904). In the illustrative embodiment, there is a function vector for the freeze notification call. The object then suspends (aborts) any and all long running jobs that it started in its corresponding raidio structure (Step 905). Examples of long-running jobs include disk zeroing, disk reconstruction, disk scrubbing, reparity, and mirror resynchronization. Thereafter, in Step 906, the object transitions to a "frozen" state (i.e., is marked frozen). Likewise when each child object gets the notification, it sends the freeze notification to its children objects, aborts any and all long running jobs that it started in its corresponding raidio structure, and transitions to a frozen state.

For example, assume the configuration thread 310 imposes a freeze condition on volume object 410 of the configuration tree 400. The volume object sends a freeze notification to the mirror object 420, which then sends a freeze notification to the plex object 430. The mirror object then aborts any long running jobs (such as a mirror resynchronization or verification operation) that it started. Note that an object may abort a long running job by asserting a flag in the corresponding raidio structure for the I/O operation related to the job; when the raidio is subsequently processed, the asserted flag instructs the I/O thread to terminate (abort) processing of the operation. Note also that each long-running job typically logs some state information in the raidio at regular intervals; this state information prevents the long-running job from being restarted at the beginning of the job. In response to the freeze notification, the plex object 430 sends a freeze notification to the RAID group object(s) 440 and then aborts any long running jobs it started. The RAID group object 440, in turn, sends a freeze notification to the disk object(s) 450 and then aborts any scrub or reconstruction operation it started.

Once the freeze condition is imposed, all raidio structures on the receive list 700 of the I/O thread are allowed to drain, even if they are top level I/Os that have not yet been initiated. Marking of the object (e.g., volume object 410) as frozen prevents initiation of new I/O requests received at the RAID subsystem and directed to the object. At Step 908, the I/O thread 320 increments the current freeze_id parameter stored in the tree object 800 and, at Step 910, the new I/O requests are inserted onto the pending freeze list 816. At Step 912, the I/O thread dequeues (retrieves) a selected raidio structure from its receive list 700. At Step 914, the I/O thread 320 determines whether a freeze_id has been assigned to the raidio structure and, if it has not, the I/O thread assigns it a freeze_id equal to the current freeze_id (Step 916). At Step 918, the I/O thread determines the state of the I/O tree (e.g., whether the tree is frozen). If the I/O tree is not frozen, the selected raidio structure is processed by the I/O thread at Step 920.

However, if the I/O tree is frozen, then the I/O thread determines whether the freeze_id of the selected raidio structure is less than the current freeze_id (Step 922). If it is, the selected raidio structure is allowed to drain as an in flight I/O operation and processing is allowed to proceed at Step 920. As the in flight operations are processed and completed, the I/O thread updates the per-object and per-volume accounting information, e.g., the active I/O count (active_ios 810), at Step 924. Specifically, the per-volume and per-object counters are incremented upon processing of an operation specified by the raidio structure and those counters are decremented when the operation completes in the referenced object. If the freeze_id of the selected raidio structure is greater than or equal to current freeze_id, then the selected raidio structure is not processed and is placed on the pending freeze list 816 for that I/O tree at Step 926.

At Step 928, the I/O thread determines whether the accounting information indicates that there are no further in flight I/O operations underway, i.e., the active_ios 810 equals zero. If the active_ios does not equal zero, the sequence returns to Step 912. If the active_ios equals zero, the sequence proceeds to Step 930 where the configuration management operation is executed. It should be noted that an I/O tree can alternatively enter a freeze state when the active I/O count (active_ios) is equal to zero. At that point there are no I/O operations in flight; i.e., all of the in flight I/O operations have run to completion. At Step 932, the configuration operation completes and, at Step 934, an unfreeze request is initiated for the target object (volume) of the RAID subsystem.

Upon receiving the unfreeze request, the object sends an unfreeze notification call to all subordinate (children) objects in the tree (Step 935). In the illustrative embodiment, there is a function vector for the unfreeze notification call. In Step 936, the object transitions to an "unfrozen" state (i.e., is marked thawed). The I/O requests and raidio structures on the pending freeze list 816 are then restarted at Step 938 by, e.g., removing them from the list 816 and enqueuing them to the receive list 700 of the I/O thread. At Step 940, the I/O thread begins dequeuing and processing raidio structures (including any suspended long running jobs) on the receive list. The sequence then ends at Step 942.

In summary, the present invention utilizes object-based accounting procedures to determine whether there is concurrent, in flight I/O activity directed to an object when a freeze condition is imposed in response to, e.g., a configuration management operation. If there is concurrent I/O activity, a set of condition variables is used to prevent new access to the object (e.g., to implement freezing at the object level), pending completion or suspension of the in flight I/O operations. The accounting procedures are invoked each time an I/O task (a raidio structure) is instantiated, incrementing per-object and per-volume I/O activity counters (active_ios 810) upon entry of processing by the I/O thread (dequeuing from receive list 700) and decrementing the per-object and per-volume activity counters upon exit (i.e., when the respective I/O activity processing completes). When the accounting procedures indicate that all in flight I/O operations have completed, the freeze is declared successful and the configuration management operation proceeds. When the configuration management operation completes, the object is unfrozen and pending I/O requests targeted to the object are restarted.

In addition to the I/O activity that traverses "normal" data paths of the RAID subsystem, entry points may be added for accounting procedure management during disk zeroing, checksum I/O operations, reparity management and long-running I/O operations (e.g., scrubs, reparity, etc.). For disks that are not assigned to a volume, e.g., when disk zeroing is launched for an unzeroed disk added into the system, the per-volume accounting procedure may be skipped. However, some accounting may be performed on a disk pool with which the disk is associated.

While there has been shown and described an illustrative embodiment for suspending I/O operations executed by a RAID subsystem in a coherent manner, it is to be understood that various other adaptations and modifications may be made within the spirit and scope of the invention. For example, in an alternate embodiment, when the configuration thread 310 initiates a freeze request, the I/O thread 320 scans the receive list 700 for raidio structures that are not assigned a freeze_id, assigns each of those structures a freeze_id equal to the current freeze_id and then increments the current freeze_id. This guarantees that any in flight raidio structures (whether enqueued to or dequeued from the receive list) are guaranteed to proceed to completion in accordance with a fair access policy or anti-starvation feature of the invention. Moreover, although the freeze invention is illustratively described in terms of a RAID I/O request issued by a user from the file system 280 and received by the RAID subsystem at the volume level, it is understood that a RAID I/O request may alternatively be initiated at a RAID object level with respect to long-running jobs, such as mirror resync or disk reconstruction, or even at a VBN range within a RAID object.

Advantageously, the present invention imposes correctness without fundamental changes or intricate special casing to I/O operation implementations. The novel technique also prevents data corruption and incorrect configuration changes arising from interleaving of configuration management operations with concurrent I/O activity in the RAID subsystem. Furthermore, the present invention is extensible to new I/O operation types and configuration management request types.

A preferred embodiment of the invention has been described herein with reference to a file server having a storage operating system with a file system layer and a RAID subsystem (among other components), which manages file semantics in order to access data organized in files. It should be understood, however, that the invention can be practiced in any system or device that coordinates and suspends I/O operations, particularly in light of configuration management changes. One type of system or device in which the invention can be embodied is designed to perform a data storage function, and if so, may perform data-related operations, e.g., in response to data access requests. Such requests may use file-based and/or block-based semantics, depending on the implementation and, correspondingly, the system or device may organize data in files or in another manner. Moreover, such systems and devices may or may not incorporate features and functions described herein, such as, for example, a file system layer or a RAID subsystem, or may combine or otherwise modify their operation, without departing from the principles of the invention. Finally, the invention has been described herein using nomenclature such as "raidio" which may appear to be specific to implementations of the invention providing RAID functionality; however, the invention in its broader sense is not so limited.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. In addition, it is understood that the data structures described herein can include additional information while remaining within the scope of the present invention. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for suspending input/output (I/O) operations executed by a subsystem of a storage system, comprising:
    constructing an I/O tree that accommodates a flow of I/O operations through the subsystem and targeted to the object;
    imposing a freeze condition on an object of a the I/O tree representing a logical configuration of storage devices coupled to the storage system;
    instantiating raidio structures used to communicate with the objects of the configuration tree, the objects having configuration interfaces defining services provided by a process of the subsystem;
    providing an I/O thread having a receive list to process the instantiated raidio structures;
    invoking accounting procedures each time a raidio structure is instantiated;
    enabling in flight I/O operations directed to the object to reach a recoverable state in the event the subsystem subsequently fails;
    blocking new I/O requests directed to the object at the subsystem until the freeze condition is lifted;
    incrementing a per-object activity counter in response to dequeuing of a raidio structure from a receive list of the I/O thread; and
    decrementing the per-object activity counter in response to completion of processing of the raidio structure.

2. The method of claim 1 further comprising the step of constructing an I/O tree that accommodates a flow of I/O operations through the subsystem and targeted to the object.

3. The method of claim 2 wherein the step of constructing comprises the step of instantiating raidio structures used to communicate with the objects of the configuration tree, the objects having configuration interfaces defining services provided by a process of the subsystem.

4. The method of claim 3 further comprising the step of providing an I/O thread having a receive list to process the instantiated raidio structures.

5. The method of claim 4 further comprising the step of invoking accounting procedures each time a raidio structure is instantiated.

6. The method of claim 1 wherein the step of blocking comprises the step of using condition variables to prevent new access to the object pending completion of the in flight I/O operations.

7. The method of claim 6 further comprising the step of updating accounting information as the in flight I/O operations complete.

8. The method of claim 7 wherein the subsystem is a redundant array of independent disks (RAID) subsystem of a storage operating system executing on the storage system.

9. The method of claim 1 wherein the object is a volume of a storage operating system executing on the storage system.

10. A system adapted to suspend input/output (I/O) operations directed to an object of a configuration tree representing a logical configuration of storage devices coupled to a storage system, comprising:
    a storage operating system executing on the storage system and having a subsystem that facilitates storage and retrieval of information to and from the storage devices in accordance with the I/O operations;
    an I/O tree configured to accommodate a flow of the I/O operations through the subsystem and directed to the storage devices;
    a configuration thread executing in the subsystem and configured to impose a freeze condition on the object;
    an I/O thread executing in the subsystem, the I/O thread using a set of condition variables, the set of condition variables having:
        a freeze_id in a form of a monotonically increasing value;
        an active I/O count in a form of a per-object I/O activity counter; and
        a state of the I/O tree,
    to enable in flight I/O operations directed to the object to reach a recoverable state in the event the subsystem subsequently fails and to block new I/O requests directed to the object at the subsystem until the freeze condition is lifted.

11. The system of claim 10 wherein the I/O task is a raidio structure used to communicate with a corresponding object of the configuration tree having configuration interfaces defining services provided by a process of the subsystem.

12. The system of claim 11 wherein the raidio structure comprises:
    a message section including information about a type of the I/O operation, a priority of the operation and a destination identifier (ID) of the corresponding object within the configuration tree to which the communication is directed; and
    a raidio-specific data section including a list of buffers needed to accommodate the I/O operation, a starting location on a disk to which the operation is targeted and a length of a buffer chain provided in the buffer list.

13. The system of claim 12 wherein the subsystem is a redundant array of independent disks (RAID) subsystem.

14. The system of claim 10 wherein the subsystem is a redundant array of independent disks (RAID) subsystem.

15. The system of claim 10 further comprising means for constructing an I/O tree that accommodates a flow of I/O operations through the subsystem and targeted to the volume.

16. A computer readable media, comprising:
    said computer readable media containing instructions for execution on a processor for a method of suspending input/output (I/O) operations executed by a subsystem of a storage system, the method having the steps of:
    constructing an I/O tree that accommodates a flow of I/O operations through the subsystem and targeted to the object;
    imposing a freeze condition on an object of a the I/O tree representing a logical configuration of storage devices coupled to the storage system;
    instantiating raidio structures used to communicate with the objects of the configuration tree, the objects having configuration interfaces defining services provided by a process of the subsystem;
    providing an I/O thread having a receive list to process the instantiated raidio structures;

invoking accounting procedures each time a raidio structure is instantiated;
enabling in flight I/O operations directed to the object to reach a recoverable state in the event the subsystem subsequently fails;
blocking new I/O requests directed to the object at the subsystem until the freeze condition is lifted;

incrementing a per-object activity counter in response to dequeuing of a raidio structure from a receive list of the I/O thread; and
decrementing the per-object activity counter in response to completion of processing of the raidio structure.

* * * * *